United States Patent Office 3,247,274
Patented Apr. 19, 1966

3,247,274
PREPARATION OF DI-PARA-XYLYLENES
Dale F. Pollart, Somerville, N.J., assignor to Union Carbide Corporation, a corporation of New York
No Drawing. Filed July 9, 1964, Ser. No. 381,569
The portion of the term of the patent subsequent to Sept. 15, 1981, has been disclaimed and dedicated to the Public
9 Claims. (Cl. 260—670)

This application is a continuation-in-part of copending application Serial No. 53,574, filed August 22, 1960, now U.S. Patent No. 3,149,175.

This invention relates to a process for the preparation of cyclic di-para-xylylene. More particularly, this invention relates to a method for the preparation of cyclic di-p-xylylene in improved yields and conversion by the pyrolysis of 1,2-di-p-tolylethane, the linear dimer of p-xylene, and the selective condensation of the resultant pyrolysis vapors in a fluid medium.

Cyclic di-p-xylylene having the structure

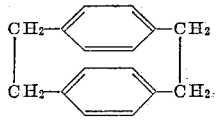

was first isolated as a by-product from the poly-p-xylylene prepared by pyrolysis of p-xylene as described by Brown et al. Nature, 164, 915 (1949) but only in trace amounts in the polymer. It has also been prepared by the following scheme

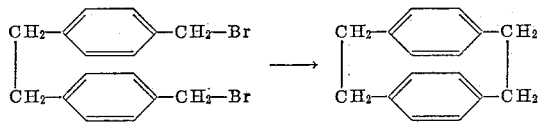

as described by Cram et al., J. Am. Chem. Soc. 93, 5691 (1951). The di-p-xylylene by such a process was secured, however, only in a 2.1% yield and a 2.5% efficiency. Such yields and low efficiencies can hardly be tolerated on commercial scale production of such a product. Thus, there remained the problem of finding a suitable and satisfactory method for producing di-p-xylylene in reasonable yields and efficiencies.

The present invention provides a method for producing cyclic di-p-xylylene in yields of 20 percent or higher and at very high conversion efficiencies. This process consists of generating the reactive diradical

by the pyrolysis of 1,2-di-p-tolylethane, having the structural formula

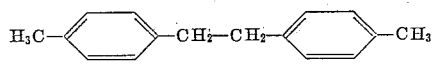

at elevated temperatures and condensing the pyrolysis vapors in a fluid medium containing an inert organic solvent. The vapors containing the reactive diradicals selectively condense and dimerize in the solvent into the cyclic dimer, di-p-xylylene, in much higher yields than in any other known process.

In the present invention, 1,2-di-p-tolylethane is converted to the cyclic dimer, di-p-xylylene as follows:

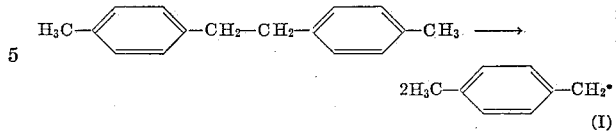
(I)

The p-xylyl monoradicals disproportionate to yield p-xylene and a reactive p-xylylene diradical:

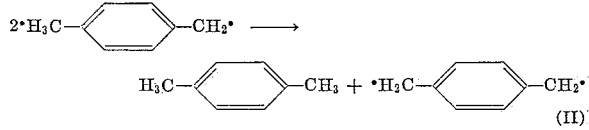
(II)

The reactive diradicals condense and dimerize to the cyclic dimer, di-p-xylylene in the presence of an inert organic solvent for said diradicals:

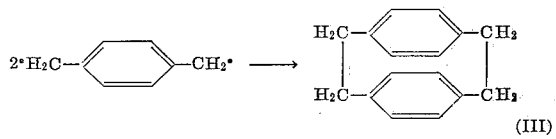
(III)

In this process, there are essentially no polymeric by-products formed. When present, they are generally less than about 0.1%. The efficiency of conversion to the p-xylylene diradicals (II) is at least about 75%. The yield of di-p-xylylene (III) is about 20% per pass and the overall efficiency of conversion to di-p-xylylene is greater than about 45%.

The reactive diradical, p-xylylene is generated in this process by pyrolysis of di-p-tolylethane at a temperature of at least 800° C. and preferably between 850° C. and 975° C. At temperatures above 1000° C. some decomposition of the reactive diradical is occasioned which undesirably affects the resultant yield of product.

Low partial pressure of the di-p-tolylethane are desirable in this process, preferably such that the di-p-tolylethane partial pressure is between about 0.1 and 20 mm. Hg., with optimum conditions generally being secured at a partial pressure of the di-p-tolylethane of about 1 to 10 mm. Hg.

While the presence of an inert diluent in this process is not critical, it is often desirable for use in this process in order to reduce the partial pressure of the di-p-tolylethane and make it possible to operate at higher total pressures. It has been found that steam is a particularly desirable inert diluent in this process in that it permits operation at atmospheric pressure and has a protective effect in preventing decomposition of the di-p-tolylethane although other inert diluents can be also employed, for example, nitrogen, argon and like inert gases. Thus, the total pressure of the system depends on the desired operating partial pressure of the di-p-tolylethane, and the amount of steam and/or other diluents employed. When no diluents are employed, the pyrolysis reaction is preferably carried out at total pressures of 0.1 to 10 mm. Hg. Thus, in this process, it is possible to operate at total pressures even up to atmospheric pressure or higher.

The amount of diluent present in this process is not narrowly critical but when employed it is preferably present in an amount of at least about 10 moles per mole of di-p-tolylethane and generally between about 10 to 300 moles per mole of di-p-tolylethane although excess steam is not detrimental to the process.

Pyrolysis of the di-p-tolylethane is conveniently conducted by vaporizing di-p-tolylethane (M.P. 80° C.) and passing it through a pyrolysis zone preferably a heated tube or reaction vessel for a short period of time. Time of contact in the pyrolysis zone must be at least sufficient to pyrolyze or crack a portion of the di-p-tolylethane into the reactive diradical, p-xylylene, but not so long that charring or complete decomposition occurs. Contact time depends to a great degree on the particular temperature selected for pyrolysis; the lower the temperature the longer the permissable contact time and vice versa. At most desirable conditions of about 900° C. contact times are preferably between about 0.01 to 1.0 second. Seldom would it be desirable to have a contact time greater than one second. At the higher operating temperatures, contact times of 0.01 second or shorter may at times be indicated.

Condensation of the p-xylene diradicals into the di-p-xylylene is accomplished in the presence of an organic solvent. In order to stabilize the composition of the pyrolysate vapors and prevent disproportionation of diradical and p-xylene back to monoradical it is preferable to cool to about 500° C. but not below about 400° C. in order to avoid dropping below the condensation temperature of the reactive diradical before it is absorbed in the organic solvent. Cooling to below the ceiling condensation temperature in the absence of the organic solvent causes almost spontaneous polymerization of the reactive diradical to poly-p-xylylene. This ceiling condensation temperature is generally below about 400° C. depending somewhat on the operating pressure. However, in the vaporous state, the reactive diradical is relatively stable and does not polymerize.

The cooling of the pyrolysate vapors may be accomplished in any of several convenient means. For instance, internal or external condensers, cooling coils, tubes or the like can be employed immediately after the pyrolysis zone, or if desired, natural cooling caused by long runs of air cooled tubing or piping from the pyrolysis zone to the condensing medium can be used. It is also possible to mix the organic solvent condensing medium in the vapor state in a suitable manner or mixing chamber with the pyrolysate vapors as another method. Preferably, direct cooling means, e.g., injection of a cool vapor into the pyrolysate vapors, are employed in order to rapidly reduce the reaction temperatures thereby avoiding undesired shifts in stream composition.

It is essential in this process that the condensation of the cooled vaporous diradical be carried out in the presence of a fluid medium of an inert organic solvent. One of the most preferred solvents is p-xylene. However, if desired, other aromatic materials such as o-xylene, m-xylene, toluene, cumene, benzene, methyl-naphthalene, o-dichlorobenzene, acetic acid, 1,2-di-p-tolylethane, mineral oil, diphenylmethane, 1,2-diphenylethane, heptane, decahydronaphthalene, and the like and preferably those having an atmospheric boiling point between about 100° C. and 350° C. can be suitably employed.

The di-xylylene product forms on the condensation of the vaporous diradicals in the presence of the fluid medium. It is not essential however that the fluid medium be in the liquid state. While this is most desirable, the condensation can be accomplished equally as well by mixing the pyrolysate vapors with vaporous aromatic solvent and simultaneously condensing the total mixture to the liquid state for recovery of the product.

Suitable gas scrubbers or spray tanks can be used to remove and condense the p-xylylene diradicals into the di-p-xylylene in this process. Gas scrubbing devices are particularly desirable in continuous operation, especially with the use of such very high boiling organic solvents as mineral oil where the di-p-xylylene can be recovered by distillation from the solvent.

When the cooled pyrolysate vapors of the reactive diradical are collected in a liquid medium, merely bubbling or dispersing the vapors below the liquid level of the aromatic solvent is also adequate to cause the p-xylylene to dimerize to the di-p-xylylene and be recovered from the solvent solution. The bath into which these vapors are condensed can be maintained at any temperature below about 300° C., and preferably from 50 to 250° C. Thus, when employed herein, the term "fluid media" is intended to cover both the liquid or gaseous state of the solvent medium in which the pyrolysate vapors are collected.

Recovery of the di-p-xylylene is relatively easy. It can, for instance, readily be recovered by removing a majority of a lower boiling solvent medium by distillation and then crystallizing the di-p-xylylene from the remaining solvent by cooling and filtering off the crystallized di-p-xylylene.

The product obtained by this process generally has a sharp melting point of 284°–285° C. and is substantially free of other possible condensation products such as poly-p-xylylene, cyclo-tri-p-xylylene, and the like.

In the preferred method of operating this process, di-p-tolylethane and steam are fed to an atmospheric pressure reactor and maintained at 900° C. The di-p-tolylethane and steam flow rates are adjusted so as to give a contact time of about 0.03 to 0.08 second and a di-p-tolylethane partial pressure of 1.0 to 10 mm. Hg. The pyrolysate vapors are cooled at the outlet of the pyrolysis zone to a temperature of about 400–700° C. and then passed into a quenching bath of boiling organic solvent where the condensation of the diradical to the cyclic dimer takes place.

The remaining uncondensed vapors are subsequently condensed. The aqueous layer is decanted. The condensed solvent is recycled to the quench bath. The solution containing the cyclic dimer is concentrated by flashing or reduced pressure distillation to about one-tenth its original volume. On cooling the di-p-xylylene crystallizes from the organic solvent in high purity and is separated from the mother liquor by filtration or by centrifugation, washed and dried.

It is, of course, realized that the dimer recovery process can be conducted either batch-wide or continuously.

The following examples are merely illustrative of the present invention and are not to be construed in derogation thereof.

EXAMPLE 1

A mixture of steam and molten 1,2-di-p-tolylethane (M.P. 80° C.) in the ratio of 110:1 parts by weight respectively was vaporized upon being fed into the glass inlet of a two zone quartz pyrolysis reactor, said glass inlet being maintained at about 300° C. The vaporized mixture was preheated to about 700°–800° C. in the first zone of said reactor and was thereafter pyrolyzed upon passage through the second zone of said reactor maintained at about 900° C. The residence time of the vaporized mixture within the second zone was about 0.05 second. The pyrolysate vapors were introduced into a 2000 milliliter round-bottomed flask containing 1000 milliliters of gently refluxing p-xylene and were thoroughly admixed therewith. The flask was fitted with an efficient water-cooled reflux condenser, the top of which was in turn connected to a Dry-Ice cooled trap which finally led to a vent for non-condensible gases. The excess steam diluent which upon condensing collected in the bottom of the flask was drained off periodically throughout the run.

At the end of the reaction period, the organic solution containing the di-p-xylylene was collected, freed of water and filtered. The solution was concentrated to 5 to 10 percent of its original volume by distillation. The concentrated solution was cooled and the crystalline di-p-xylylene which precipitated out was collected by filtration. The crystalline product, di-p-xylylene had a melting point of 283°–285° C. The remaining portion of the distillate is comprised of p-xylene which can be purified by redistillation and recycled for use in the formation of 1,2-di-p-tolylethane.

Table I shown below summarizes a number of runs made in the manner described above.

*Table I.—The pyrolysis of 1,2-di-p-tolylethane with steam diluent at atmospheric pressure*

| Run No. | Weight Ratio Steam/1,2 Di-p-Tolylethane | Temperature, (° C.) | Yield, Di-p-Xylylene, (Percent) |
|---|---|---|---|
| 1 | 110 | 800 | 20.2 |
| 2 | 50 | 900 | 11.8 |
| 3 | 35 | 900 | 12.3 |
| 4 | 17 | 900 | 6.5 |
| 5 | 13 | 900 | 8.1 |
| 6 | 110 | 925 | 17.3 |
| 7 | 110 | 900 | 20.2 |
| 8 | 110 | 850 | 14.4 |

EXAMPLE 2

A mixture of steam and molten 1,2-di-p-tolylethane in the ratio of 10:1 parts by weight respectively was vaporized upon being fed into the glass inlet of a two zone pyrolysis reactor, said glass inlet being maintained at about 250° C.; the entire system being maintained at 150 mm. Hg total pressure (0.2 atmosphere). The vaporized mixture, still at reduced pressure, was preheated and pyrolyzed as described in Example I. The pyrolysate vapors were quenched in a p-xylene bath maintained at 55° C. resulting in a 10 percent yield of di-p-xylylene having a melting point of 283–285° C. which was isolated in the manner described in Example I.

EXAMPLE 3

Solid 1,2-di-p-tolylethane was melted, vaporized and passed through the pyrolysis reactor maintained at 900° C. and a pressure of about 0.2 millimeter with a very slow flow of nitrogen passing through said reactor as a carrier gas. The residence time in the pyrolysis zone was regulated to about 0.1 second.

The pyrolysis vapors were quenched in a mineral oil bath maintained at 90° to 100° C. and was thoroughly admixed therewith. Pure, crystalline di-p-xylylene was subsequently sublimed away from the mineral oil by heating the total mixture to about 150° C. at 0.1 to 0.5 mm. Hg of pressure.

Table II shown below summarizes a number of runs made at reduced pressures.

*Table II.—The pyrolysis of 1,2-di-p-tolylethane at reduced pressure*

| Run No. | Carrier Gas | Temp. (° C.) | Pressure (mm. Hg) | Yield, Di-p-Xylylene (Percent) |
|---|---|---|---|---|
| 1 | None | 800 | 0.2 | 9.6 |
| 2 | do | 900 | 0.2 | 21.7 |
| 3 | Nitrogen | 875 | 2.3 | 21.4 |
| 4 | do | 900 | 2.8 | 26 |

What is claimed is:

1. Process for the preparation of cyclic di-p-xylylene substantially free of poly-p-xylylene which comprises pyrolyzing 1,2-di-p-tolylethane at a temperature between about 800° C. and 1000° C. to generate the reactive p-xylylene diradical

and condensing said reactive diradical in intimate mixture with a fluid medium containing an inert organic solvent maintained at a temperature below about 300° C., and recovering the cyclic di-p-xylylene from said fluid medium.

2. Process for the preparation of cyclic di-p-xylylene substantially free of poly-p-xylylene which comprises pyrolyzing 1,2-di-p-tolylethane in an inert diluent at a temperature between about 800° C. and 1000° C. to generate the reactive p-xylylene diradical

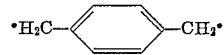

and condensing said reactive diradical in intimate mixture with a fluid medium containing an inert organic solvent maintained at a temperature between about 50° C. and 250° C., and recovering the cyclic di-p-xylylene from said fluid medium.

3. Process as defined in claim 2 wherein the pyrolysis temperature is between about 850° C. and 975° C.

4. Process as defined in claim 2 wherein the inert diluent is steam.

5. Process as defined in claim 3 wherein the steam and 1,2-di-p-tolylethane are present respectively in the pyrolysis mixture in molar ratios of from about 10:1 to 300:1.

6. Process for the preparation of cyclic di-p-xylylene substantially free of poly-p-xylylene which comprises subjecting a mixture of 1,2-di-p-tolylethane and steam to a pyrolysis temperature between about 800° C. and 1000° C. for a period of from about 0.01 to 1.0 second to generate the reactive p-xylylene diradical

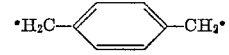

the partial pressure of said di-p-tolylethane being between about 0.1 and 20 mm. Hg, and condensing the reactive diradicals thus formed in intimate mixture with a fluid medium containing an inert organic solvent for said diradicals maintained at a temperature between about 50° C. and 250° C., and recovering the cyclic di-p-xylylene from said fluid medium.

7. Process as defined in claim 6 wherein the partial pressure of the 1,2-di-p-tolylethane is between about 1 and 10 mm. Hg.

8. Process as defined in claim 6 wherein the reaction mixture is subjected to pyrolysis for a period of from about 0.03 to 0.08 second.

9. Process as defined in claim 6 wherein the inert organic solvent is p-xylene.

References Cited by the Examiner

UNITED STATES PATENTS 2,878,260   3/1959   Bloch et al. _____ 260—668
3,149,175   9/1964   Pollart _____ 260—670

DELBERT E. GANTZ, *Primary Examiner.*

ALPHONSO D. SULLIVAN, *Examiner.*